United States Patent [19]

Kipp

[11] Patent Number: 5,571,977

[45] Date of Patent: Nov. 5, 1996

[54] PROCESS AND DEVICE FOR INSPECTING AND/OR SERVICING AND REPAIRING SUBSIDIARY CANALS BRANCHING OFF FROM A MAIN DRAIN

[76] Inventor: Jens-Werner Kipp, Klashofsiedlung 13, D-33659 Bielefeld, Germany

[21] Appl. No.: 397,201

[22] PCT Filed: Sep. 6, 1993

[86] PCT No.: PCT/EP93/02412

§ 371 Date: Mar. 7, 1995

§ 102(e) Date: Mar. 7, 1995

[87] PCT Pub. No.: WO94/05989

PCT Pub. Date: Mar. 17, 1994

[30] Foreign Application Priority Data

Sep. 8, 1992 [DE] Germany ............... 42 29 787.7
Jul. 8, 1993 [DE] Germany ............... 9310192 U

[51] Int. Cl.⁶ .................................................. H04N 7/18
[52] U.S. Cl. ............................................... 73/865.8
[58] Field of Search ........................ 73/865.8, 623; 348/84; 15/104.061, 104.31; 324/220, 221

[56] References Cited

U.S. PATENT DOCUMENTS

| | | |
|---|---|---|
| 3,160,904 | 12/1964 | Swanson . |
| 3,370,599 | 2/1968 | Ciaccio . |
| 3,754,275 | 8/1973 | Carter et al. . |
| 4,107,738 | 8/1978 | Van Norman . |
| 4,651,558 | 3/1987 | Martin et al. . |
| 4,677,472 | 6/1987 | Wood . |
| 4,677,865 | 7/1987 | Lehmann . |
| 4,735,501 | 4/1988 | Ginsburgh et al. . |
| 4,991,006 | 2/1991 | Wood . |
| 5,018,545 | 5/1991 | Wells . |
| 5,088,336 | 2/1992 | Rosenberg et al. . |
| 5,329,662 | 7/1994 | Salecker . |

FOREIGN PATENT DOCUMENTS

| | | |
|---|---|---|
| 0183134 | 6/1986 | European Pat. Off. . |
| 1308927 | 10/1962 | France . |
| 299309 | 5/1913 | Germany . |
| 1076583 | 2/1960 | Germany . |
| 2107988 | 8/1972 | Germany . |
| 2906382 | 8/1980 | Germany . |
| 3039556 | 5/1982 | Germany . |
| 3201505 | 12/1982 | Germany . |
| 3124268 | 1/1983 | Germany . |
| 3324525 | 2/1985 | Germany . |
| 3407740 | 9/1985 | Germany . |
| 3614046 | 11/1986 | Germany . |
| 3803274 | 8/1989 | Germany . |
| 9105211 | 8/1991 | Germany . |
| 4031715 | 4/1992 | Germany . |
| 3877721 | 5/1993 | Germany . |
| 2228644 | 8/1990 | United Kingdom . |

OTHER PUBLICATIONS

INFO–Neues von der Kanal–Müller–Gruppe, Dec. 17, 1994, Kanal–Müller–Gruppe.

Keller, "Ein neues Verfahren zur Inspektion von Entwässerungskanälen und –leitungen mittels opto–hydraulischer Zustandserfassung", Abwasserableitung, Nov. 1991, pp. 1476–1483.

Störner et al., "Einfluβ von Kanalreinigungsmundstücken auf das Reinigungsergebnis mit Hochdruckspülern", Abwasserableitung, Nov. 1990, pp. 1340–1344.

Primary Examiner—Robert Raevis
Attorney, Agent, or Firm—Rothwell, Figg, Ernst & Kurz

[57] ABSTRACT

A process is disclosed for inspecting subsidiary canals that branch off from a main drain. A camera probe (24) is deflected from the main drain pipe (10) into the branching off subsidiary, canal pipe (12) by means of a deflecting frame (22; 76; 96). The process is characterized by a propulsion by reaction of the camera probe (24), a fluid under pressure being supplied to reaction jets (34; 90) mounted on the camera probe so as to drive the latter into the subsidiary canal pipe (12).

16 Claims, 6 Drawing Sheets

PROCESS AND DEVICE FOR INSPECTING AND/OR SERVICING AND REPAIRING SUBSIDIARY CANALS BRANCHING OFF FROM A MAIN DRAIN

The invention relates to a process and a device for inspecting canals with a camera probe.

When inspecting sewers and suchlike it is known that a television camera can be mounted on a self-propelled carriage or on a push rod and introduced into the canal so that the wall of the canal pipe can be inspected with the television camera. For this purpose, the television camera is connected via a cable with a monitor installed outside the canal.

Alternatively, it is known that to clear blockages or to clean canals, a jetting lance fitted with jets can be introduced into the canal to clean the canal pipes with high-pressure water jets ejected from the jetting lance.

When inspecting canal systems there is sometimes a need not only to inspect the main drain, but also to penetrate with a camera probe into the subsidiary canals with a smaller cross-section branching off from the main drain.

For this purpose it is known that the camera can be mounted on a steerable carriage which can also be guided into the subsidiary canals. However, this is only possible with subsidiary canals which branch off sideways from the main drain. Subsidiary canals which branch off upwards or upwards at an angle from the main drain cannot be reached in this way. There is a further disadvantage in the fact that the friction resistance of the cable pulled along by the camera carriage increases considerably at the points where there is a change of direction, so that the tractive force of the relatively small, light camera carriage is not sufficient to advance deep into the subsidiary canals. Moreover, the camera carriage can easily be brought to a stop by obstructions.

In another prior art system, installed on the canal carriage which can be displaced in the main drain is a drivable drum on which is wound a semi-rigid push rod with which a small camera probe can be advanced into the subsidiary canals. However, even with this process, only relatively small penetration depths are reached because no great resistance to penetration can be overcome due to the flexibility of the push rod.

DE 38 03 274 A1 and DE 91 05 211 U1 disclose processes and devices for inspecting subsidiary canals according to the preamble of claim 1 and the first device claim 3 where a standard camera carriage is equipped with a deflecting frame with deflection and drive rollers with which the camera, which is disposed at the front end of a flexible shaft or a semi-rigid camera cable, whose lens is normally oriented forwards in the direction of the axis of the main drain pipe, can be deflected into a branching off subsidiary canal and then advanced into the subsidiary canal on the camera cable or the shaft. However, the above-mentioned problems also occur with this process, so that one can only advance into the subsidiary canal over a limited distance.

In DE 38 77 721 T2 a jet is described with which a camera carriage for inspecting canal pipes can be propelled forward according to the principle of reaction. However, this reaction-propelled camera carriage is not suitable for use in subsidiary canals because it is not sufficiently maneuverable and cannot be guided into branching off subsidiary canals, especially when the subsidiary canals branch off upwards at an angle from the main drain.

The invention is based on the task of providing a process and a device which allow the camera probe to be advanced deeper into the subsidiary canals branching off from the main drain and which allow any obstacles to be overcome.

This task is solved with the features indicated in claims 1 and 3.

According to the invention, the camera probe is fitted with reaction jets and is connected to a hose for supplying a pressure medium to the reaction jets. By driving the camera probe forward according to the reaction-propulsion principle, a high driving force can be achieved at low structural cost and with extremely small camera probe dimensions, so that the camera probe easily penetrates into narrow subsidiary canals and can also overcome steep slopes and pull along the camera cable and the hose for the pressure medium over lengthy distances. In contrast to camera carriages with driven wheels or caterpillar tracks, the propulsive force is not impaired by a slippery layer of dirt on the canal walls. Furthermore, since the propulsive force is generated directly at the camera probe, the risk of the probe being brought to a stop by projections or irregularities in the canal wall is much less than with systems where the probe is pushed forward with a push rod.

Both compressed air and water can be used as the pressure medium to generate the necessary propulsion. If water is used in particular, the pipe walls can be cleaned at the same time. It is therefore possible, for example, to clean the pipe wall when the camera probe is run in and then, when the probe is retracted, to inspect the pipe wall that has been freed of encrusted dirt, so that damaged spots can be more easily detected.

Advantageous developments and designs of the invention are given in the sub-claims.

The reaction jets are preferably disposed on a rim which encircles the periphery of the watertight housing of a standard camera probe at a short distance from the front end, and the jet openings are oriented backwards at an angle onto the pipe wall. This manner of construction ensures that the camera probe is kept at a distance from the pipe wall by the jets, so that projections and irregularities in the pipe wall can more easily be overcome and the camera lens is less easily dirtied. Furthermore, in canal pipes whose inner diameter is much bigger than the diameter of the camera probe, this permits an approximate self-centering of the camera probe along the pipe axis, so that the pipe wall can be equally well inspected over its entire circumference.

It is also advantageous to integrate the camera cable directly in the hose for the pressure medium, so that only one single supply line needs to be pulled along by the probe. For example, the camera cable can run through the inside of the hose, or the wires of the camera cable can be integrated inside the pressure-resistant jacketing of the hose.

Alternatively, it is conceivable to connect several hoses with a correspondingly smaller cross-sections to the camera probe, so that individual reaction jets or groups of reaction jets can be operated separately. This makes the camera probe steerable, so that the probe can be guided into the subsidiary canals. The same effect can also be achieved by disposing one or several electrically, hydraulically or pull rope operated valves in the camera probe for controlling the reaction jets, or by providing pivotable reaction jets.

Another possibility, currently regarded as particularly advantageous, for guiding the camera probe into the subsidiary canal branching off from the main drain consists in holding a deflecting frame in position in the main drain at the point where the subsidiary canal branches off, which guides the camera into the subsidiary canal.

In the simplest case, the deflecting frame consists of a cylindrical block whose cross-section corresponds approximately to the cross-section of the main drain and which is tapered at its rear end so that it forms a guiding surface for the camera probe. The block is pushed into the main drain with an eccentrically disposed push rod before the camera probe is introduced into the main drain. When an offshoot is discovered in the main drain by the camera probe, the block is held in place by the push rod and rotated so that its guiding surface is directed towards the branching off subsidiary canal. The camera hose is then paid out, so that the camera probe advances into the subsidiary canal.

In another embodiment, the deflecting frame is mounted on a standard camera carriage for the main drain. In this case, the camera hose for the camera probe to be introduced into the subsidiary canal can be unwound from a drum mounted on the camera carriage or, if the hose is fed in from the manhole, can be pulled along by the camera carriage using a grip roller drive or suchlike. The reaction jets on the camera probe need then only overcome the friction resistance of the section of hose running through the subsidiary canal.

However, the travel drive of the main drain camera carriage must in this case have good traction since, in addition to the cable of the main drain camera, the hose and possibly the separate cable for the subsidiary canal camera probe also have to be pulled through the main drain and, in addition, when the hose is operated, additional tractive forces are exerted on the camera carriage. It is therefore expedient to brace the camera carriage in the main drain with jaws which can part depending on the tractive force or with roller feet.

According to one particularly advantageous design of the process of the invention, a location finder is mounted on the camera probe provided with reaction jets in place of the actual camera, or in addition thereto, whose locating signals can be measured above ground, and thereby indicate the position of the probe introduced into the canal. The position of the damaged spots detected by the camera can be precisely determined in this way. If work is carried out using a combination of camera and location finder, precise and detailed location plans of the canals can be drawn up in one operation at the same time as the state of the canals is inspected. This significantly simplifies the planning of repair work if a need for repairs is diagnosed as a result of the canal inspection. The measurements obtained with the location finder can be electronically processed in a CAD system to draw up location plans, and the data obtained in this way can be entered in an electronic canal-cadastre so that precise information about the position and the state of the subsidiary canals relating to the main drains stored in the cadastre can be called up at any time.

Preferred embodiments of the invention will be explained in more detail below with reference to the drawings, in which.

Figure 1:
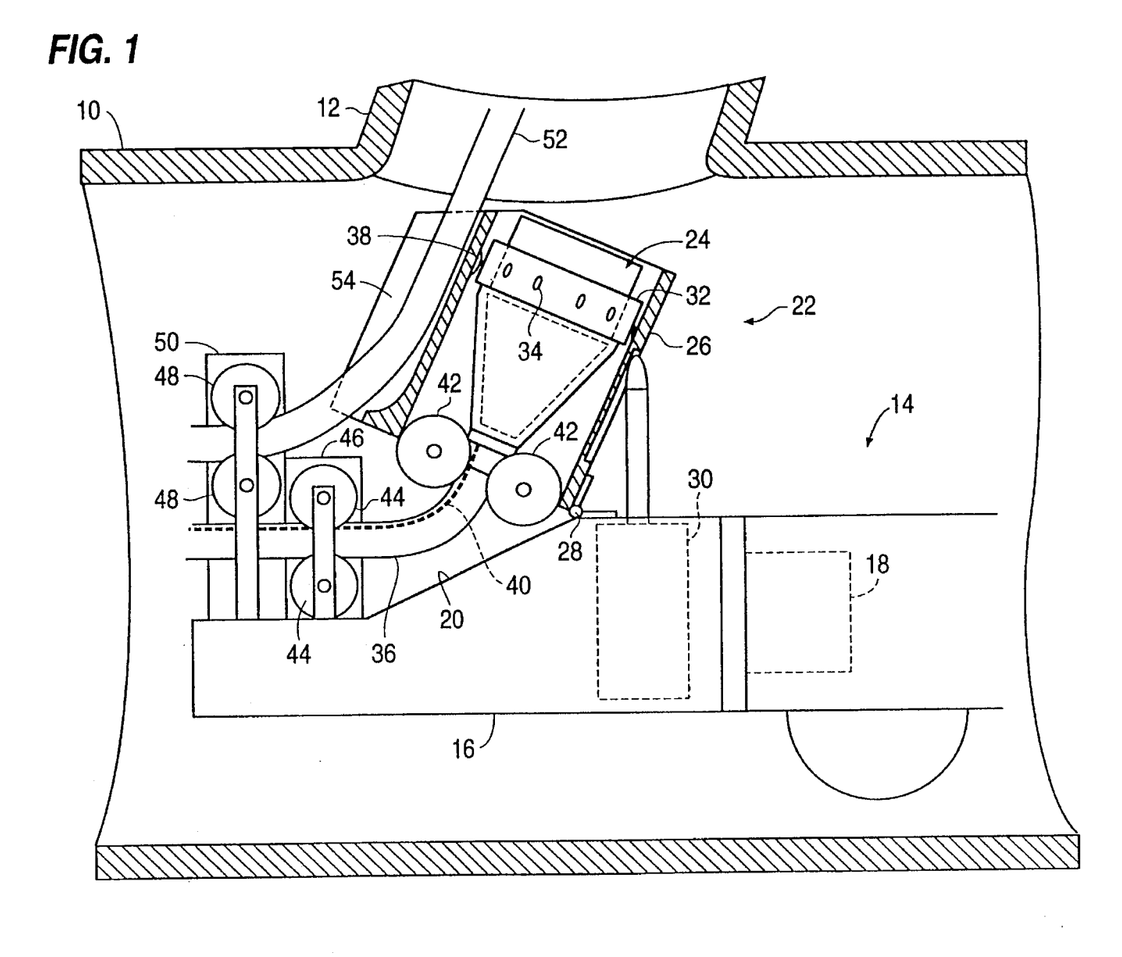
FIG. 1 is an example of an embodiment of the device according to the invention in a main drain, from which a subsidiary canal branches off.

FIG. 1 is a longitudinal section through a main drain pipe 10, from which a subsidiary canal pipe 12 branches off upwards. In the main drain pipe 10 a camera carriage 14 can be displaced, whose construction is basically known and of which therefore only the rear part is shown in the drawing. Mounted at the front end of the camera carriage 14 is a main drain camera (not shown) for inspecting the main drain pipe 10. From the camera carriage 14, a cable (not shown) runs through the main drain pipe 10 to a manhole from where the camera carriage 14 was started. The drive mechanism for the camera carriage is supplied with power via this cable and, in addition, the signals from the main drain camera and control signals for operating the camera and the camera carriage 14 are transmitted through this cable.

Mounted at the rear end of the camera carriage 14 is a shaft 16 which can be rotated around its axis running parallel to the axis of the main drain pipe 10 with an electric or hydraulic motor 18. The shaft 16 is tapered at its rear end and forms a platform 20 on which a deflecting frame 22 for a camera probe 24 for inspecting the subsidiary canal pipe 12 is mounted.

The deflecting frame 22 is essentially formed by a pipe-shaped mount 26 which is pivotably connected with the shaft 16 by a hinge 28. The pivoting movement of the mount 26 is controlled by an air cylinder or a hydraulic cylinder 30.

The camera probe 24 has a watertight housing of known construction which accommodates a television camera (not shown) in such a way that an area located in front of the front face of the camera probe, top right in FIG. 1, is captured by the camera with a relatively wide aperture angle. In the state shown in FIG. 1, the opening of the subsidiary canal pipe 12 thus lies within the field of view of the camera in the camera probe 24.

The housing of the camera probe 24 is encircled by a rim of jets 32 which has a number of jet openings 34 oriented outwards and backwards at an angle in relation to the axis of the camera probe 24. The rear end of the rim of jets 32 is connected to the camera probe 24 with a high-pressure resistant hose 36 via which a pressure medium, water, for example, is supplied at high pressure so that it exits radially from the jet openings 34, as symbolized in FIG. 1 by jets 38. A camera cable 40 for supplying power to the camera probe 24 and transmitting the camera signals is integrated in the hose 36. Disposed at the bottom end of the mount 26 there are two guide rollers 42 which accommodate the hose 36 between them. In addition, the hose 36 is gripped between two drive rollers 44 which are mounted on the platform 20 and can be driven in opposite directions by a motor (not shown) accommodated in the shaft 16 and by a gear mechanism 46 which is only indicated in the drawing by a dash-dot line.

Two other drive rollers 48 with associated gear mechanisms 50 are disposed upwardly offset opposite the drive rollers 44 on the platform 20 and accommodate a rinsing hose 52 between them. The rinsing hose 52 runs through a guide channel 54 fixed to the outside of the mount 26 into the subsidiary canal pipe 12 and on its free end has a rinsing jet for cleaning the subsidiary canal.

As a unit, the deflecting frame 22 is designed and disposed in such a way that there is room for it in a main drain pipe 10 with a relatively narrow cross-section even when the mount 26 is in different pivot positions. If the camera carriage 14 itself does not leave enough room in narrow canals for the deflecting frame to be mounted, the deflecting frame can also be designed as a type of trailer to the camera carriage.

The way in which the above-described device operates will be explained below.

The self-propelled camera carriage 14 drives under remote control into the main drain pipe 10 until the main drain camera mounted at the front end of the camera carriage captures the offshoot of the subsidiary canal pipe 12. Using the camera image on the monitor, the operator controls the motor 18 so that the shaft 16 is rotated in such a way that the azimuth of the mount 26 corresponds with the azimuth of the opening of the subsidiary canal pipe 12. The camera carriage 14 is then advanced forwards and the image transmitted by the camera probe 24 is monitored until the camera carriage reaches the position shown in FIG. 1 and the opening of the subsidiary canal pipe 12 appears on the screen connected with the camera probe 24. Using the hydraulic cylinder 30 the mount 26 is then pivoted such that its axis runs approximately parallel to the axis of the subsidiary canal pipe 12.

Then, using the drive rollers 48, the rinsing hose 52 is paid out so that the rinsing jet which is mounted on it is guided through the guide channel 54 into the subsidiary canal pipe 12. The correct introduction of the rinsing hose 52 into the subsidiary canal pipe 12 can be monitored with the camera probe 24. The subsidiary canal pipe 12 is then rinsed out with the rinsing hose 52. If the subsidiary canal pipe branches off upwards, as shown in FIG. 1, it is expedient to advance the camera carriage a little beforehand (to the right in FIG. 1 ) so that the camera probe 24 is not dirtied by the rinse water running out of the subsidiary canal pipe 12. The forward motion of the rinsing hose 52 in the subsidiary canal pipe 12 is effected partially by the drive rollers 48 and additionally by the propulsion of the rinsing jet (not shown). After the subsidiary canal pipe 12 has been cleaned, the rinsing hose 52 is retracted until the end fitted with the rinsing jet rests in the guide channel 54. The camera carriage 14 is positioned such that the opening of the pipe-shaped mount 26 is oriented precisely towards the axis of the subsidiary canal pipe 12.

When the pressurized water supply via the hose 36 is then switched on, the camera probe 24 advances in the subsidiary canal pipe 12 as a result of the propulsion generated by the jets 38, and the previously cleaned pipe wall can be inspected with the camera. Whilst the camera probe 24 is driven forwards, the hose 36 is pulled along by the drive rollers 44, so that the driving force generated by the reaction jets 34 is only needed for the section of the hose 36 lying between the camera probe 24 and the drive rollers 44. The guide rollers 42 ensure that the hose 36 is not damaged on the edge of the mount 26.

With the aid of the device according to the invention subsidiary canal pipes can be inspected up to a great depth in the way described above, and the device can be adapted to any directions in which the subsidiary canal branches off by rotating the shaft 16 and pivoting the mount 26. When the inspection of a subsidiary canal pipe is terminated, the camera probe 24 is retracted back into the position shown in FIG. 1 and the camera carriage 14 advances to the offshoot of the next subsidiary canal pipe where the same inspection procedure is repeated. The pairs of drive rollers 44 and 48 can be fixed, for example, by using self-locking drive motors or by appropriate couplings or locking mechanisms, such that the hoses 36 and 52 are gripped and pulled along when the camera carriage 14 advances.

Because the power cable (not shown) for the camera carriage 14 also has to be pulled along when the camera carriage 14 advances in addition to the two hoses 36 and 52, relatively high tractive forces can occur over long stretches of main drain so that the camera carriage 14 has to have correspondingly good traction. Furthermore, when the hoses 36,52 are driven forward by the pairs of drive rollers 44 and 48, it may be necessary to hold the camera carriage 14 in position in the main drain pipe 10 to absorb the reaction forces which occur. The camera carriage 14 construction shown diagrammatically in FIGS. 2 and 3 is suitable for these purposes.

Figure 2:
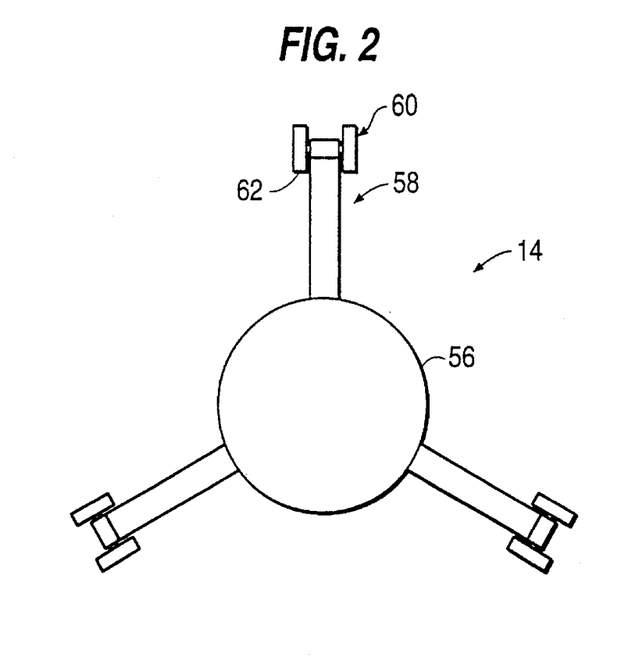
FIG. 2 is a diagrammatic front elevation of the main drain camera carriage.
Figure 3:
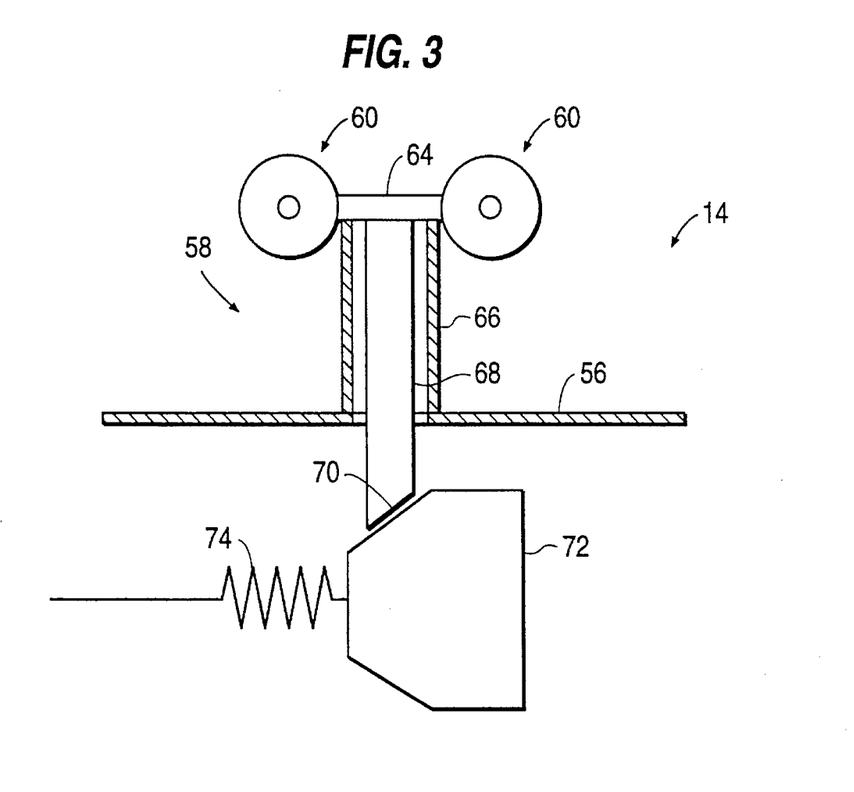
FIG. 3 is a partial longitudinal section of the camera carriage of FIG. 2.

According to FIG. 2, the camera carriage 14 has a cylindrical housing 56 from whose periphery at least three roller feet 58 which are disposed at uniform angular distances project radially. On its free end each roller foot 58 carries two sets of rollers 60 disposed behind each other in the axial direction of the housing 56, each with two rollers 62 which roll along the inner surface of the main drain pipe. The housing 56 is thus held coaxially in the main drain pipe. The roller feet 58 are preferably longitudinally adjustable or telescopic and are biased towards the exterior so that the canal carriage 14 can adapt to different pipe diameters.

Each set of rollers 60 has at least one driven roller 62 to guarantee that the camera carriage 14 advances uniformly even if one of the sets of rollers 60 temporarily loses contact with the inner pipe wall, eg. when traversing an offshoot. The distance between the sets of rollers 60 on each roller foot is preferably greater than the diameter of the subsidiary canal pipes branching off from the main drain pipe. Each set of rollers 60 can also optionally consist of several pairs of rollers offset opposite each other in the longitudinal direction of the main drain pip. A frame 64 connecting the sets of rollers 60 with each other is preferably pivotably mounted on the shaft of the roller foot 58 so that the rollers 62 can roll better over obstacles such as crusts on the pipe wall or misalignments on socket joints.

Since the canal carriage 14 with the construction shown in FIG. 2 can be braced in the main drain pipe, relatively high tractive forces can be absorbed.

FIG. 3 shows a mechanism with which the contact force of the sets of rollers 60 against the pipe wall can be increased depending on the tractive force. The roller foot 58 has an outer pipe 66 in which a pressure rod 68 connected to the frame 64 is displaceably guided. The pressure rod 68 extends into the inside the housing 56 and there rests with one sloped surface 70 against a cone 72. The cone 72 is held coaxially in the housing 56 and displaceably in the axial direction and in the same way also supports the pressure rods of the two other roller feet 58.

The tractive forces acting on the camera carriage 14, i.e., for example, the tractive force of the power cable and the tractive forces of the hoses 36 and 52 acting on the drive rollers 44 and 48 in FIG. 1 act via a helical tension spring 74 on the tapered end of the cone 72. Thus an increase in tractive force leads to an axial movement of the cone 72 and thus to a radially outward movement of the pressure rods 68, so that the sets of rollers 60 are braced more firmly against the pipe wall. Instead of a mechanical parting mechanism with the cone 72, a hydraulic parting mechanism can also be provided which has a pressure-generating cylinder whose piston iS acted on by the tractive force and parting cylinders connected with the pressure-generating cylinder to drive out the roller feet.

Figure 4:
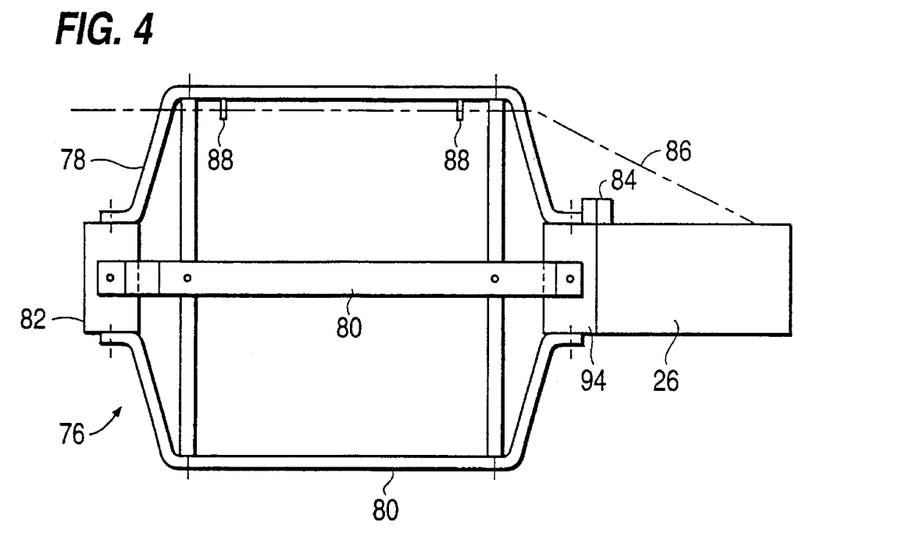
FIG. 4 is a side view of a device according to another example of an embodiment.
Figure 5:
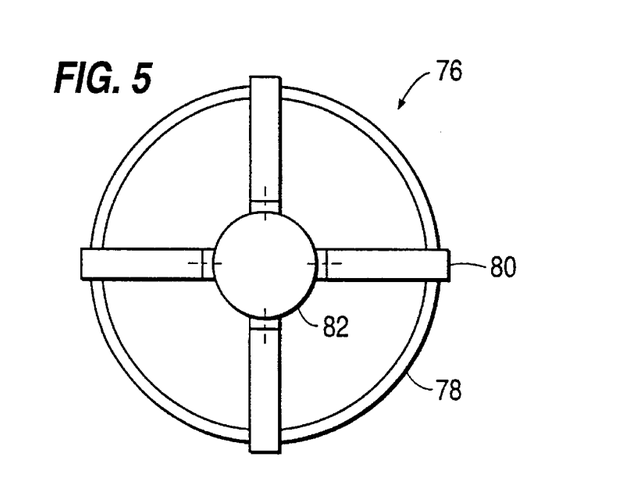
FIG. 5 is a front elevation of the device of FIG. 4.
Figure 6:
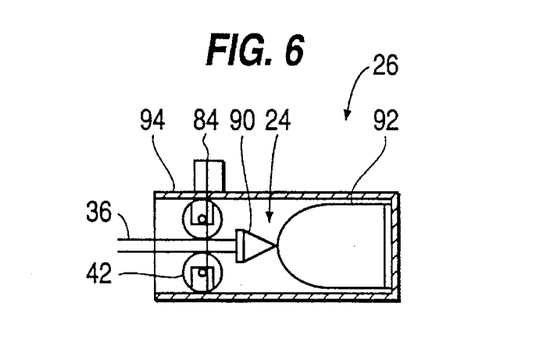
FIG. 6 is a section through a mount for a camera probe in the device of FIG. 4.

FIGS. 4 to 6 show a deflecting frame 76 which can be used independently of a camera carriage. The deflecting frame 76 has a basket-like cylindrical housing 78 whose largest diameter is somewhat smaller than the inner diameter of the main drain pipe and which can be slidingly displaced in the main drain pipe on skids 80. The drive is effected, for example, via a push rod which can be coupled to a socket 82 at the left end of the housing 78 in FIG. 4. However, motor-driven drive wheels can also optionally be disposed on the skids 80.

The pipe-shaped mount 26 for the camera probe 24 (FIG. 6) is articulated connected via a hinge 84 to the end of the housing opposite the socket 82. A pull rope 86 which runs through eyelets 88 on one of the skids 80 serves to pivot the mount 26 around the axis of the hinge 84.

In the example of the embodiment of the camera probe 24 shown in FIG. 6, the reaction jets are not disposed over the periphery of the housing 92 of the camera probe, but in a separate jet head 90 at the rear end of the housing 92. In operation, the jet head 90 thus pushes the housing 92 accommodating the camera in front of it and the housing 92 slides through the subsidiary canal pipe. The housing 92 can optionally be provided with skids made of material which slides or with wheels so that it slides better over irregularities on the inside wall of the subsidiary canal pipe.

In the example of the embodiment in FIG. 6, the guide rollers 42 are not positioned on the mount 26, but directly on a socket 94 associated with the housing 78.

Figure 7:
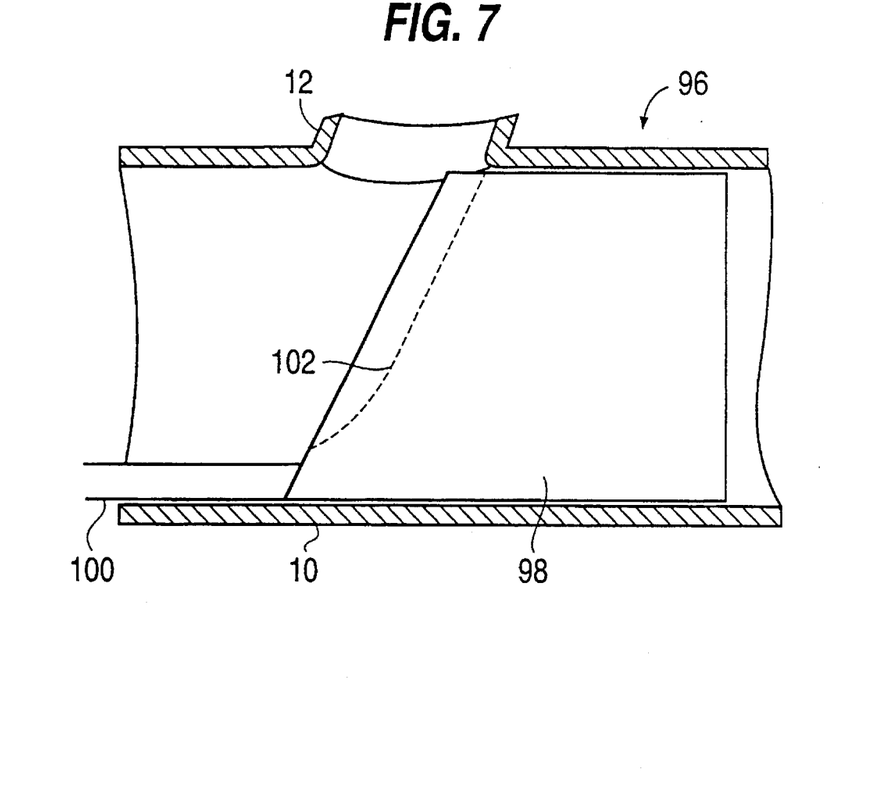
FIG. 7 is a section through a pipe offshoot with a deflecting block for a camera probe.

FIG. 7 shows an example of an embodiment of a deflecting frame 96 which is characterized by a simple construction. This deflecting frame is formed by a solid cylindrical block 98 adapted to the inner cross-section of the main drain pipe 10, which can be introduced into the main drain pipe with a push rod 100. At the rear the block 98 is tapered and the tapered surface forms a deflecting surface 102 by means of which the camera probe (not shown in FIG. 7) is deflected into the branching off subsidiary canal pipe 12. In the example of the embodiment shown the deflecting surface 102 is formed by a shallow concave which is open on the subsidiary canal pipe 12 side to the periphery of the block 98 and tapers out flatly on the push rod 100 side. When the camera probe runs up against the deflecting surface 102, the block 98 is held fast by the push rod 100. The push rod 100 also serves to rotate the block 98 around its longitudinal axis so that the deflecting surface 102 is oriented towards the branching off subsidiary canal pipe 12.

The block 98 can optionally be provided with a parting mechanism which can be operated via a second push rod and serves to brace the block 98 in the main drain pipe 10. Rollers can be provided on the parting jaws of the parting mechanism, which roll along the inner surface of the main drain pipe 10 in the direction of the periphery and, for example, are driven forward by rotating the push rod so that the block 98 can be simply and precisely rotated around its longitudinal axis.

Finally, the block 98 can also be rotatably mounted in a sleeve (not shown) which itself can be axially displaced in the main drain pipe 10. The periphery of the guide sleeve can be provided with skids or rollers which rest against the pipe wall.

Figure 8:
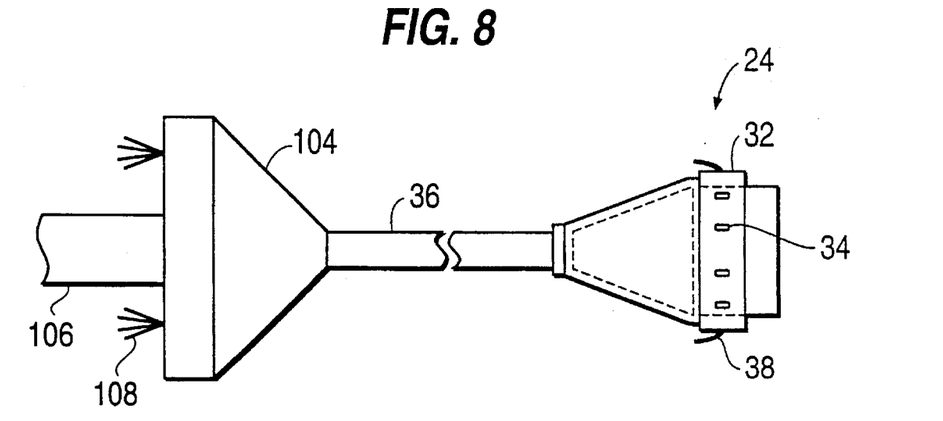
FIG. 8 is a trailer jet disposed in a hose of the camera probe.

If the camera probe has to travel a very long way in the main drain pipe 10 before it reaches the offshoot of the subsidiary canal pipe 12, the arrangement shown in FIG. 8 can also be used instead of the drive rollers 44 of FIG. 4 to overcome the then very great friction resistance of the hose. In this arrangement, the rear end of the hose 36 of the camera probe 24 is connected to a trailer jet 104 which is itself connected to a hose 106 with a larger cross-section. The pressure medium is supplied via the hose 106. The trailer jet 104 contains a valve (not shown) which only responds at a certain minimum pressure so that part of the pressure medium is ejected from the trailer jet 104 in the form of backwardly directed jets 108 whilst a further part of the pressure medium is supplied to the reaction jets 34 of the camera probe via the hose 36.

The camera probe 24 is initially driven forwards in the main drain pipe by the reaction jets 34, pulling the hose 36 along behind. During this process the pressure of the pressure medium is less than the pressure required to open the valve. After the camera probe has been guided into a subsidiary canal - eg. with the deflecting frame shown in FIG. 4 or FIG. 7, the pressure of the pressure medium is increased so that the hose 106 is pulled along in the main drain pipe by the propulsion of the trailer jet 104. In this way a high forward drive force can be generated with the trailer jet 104 whilst work is carried out in the subsidiary canal with the more flexible hose 36.

Examples of embodiments where a location finder is built into the camera probe will be described below.

A standard camera probe typically has an essentially cylindrical camera housing which is closed off at one axial end by the camera lens and possibly an additional protective disk. The actual camera unit with the camera electronics is located inside the cylindrical housing. This unit is usually constructed on a plate and is accordingly shaped as a flat board whose width corresponds to the inner diameter of the camera housing. According to one embodiment of the invention, the location finder is accommodated in one of the two segment-shaped hollow spaces which are formed on both sides of the camera unit in the cylindrical camera housing.

In another embodiment the location finder is accommodated in a ting-shaped housing which encircles a section of the housing of the actual camera probe or the cable exiting out of the rear end of this housing.

The camera probe frequently has a camera slide which accommodates the actual camera housing and serves to guide the camera in the canal pipe. In this case the location finder can be mounted on or in the camera slide.

A particularly compact construction can be achieved by connecting the location finder directly to the power supply for the camera so that there is no need for bulky batteries to power the location finder. For this purpose the location finder is designed so that it works with the camera operating voltage of eg. 12 Volt, or a small electronic voltage transformer is provided which converts the camera operating voltage to the voltage required by the location finder.

This solution has the added advantage that during lengthy inspections there need be no interruptions to change the batteries for the location finder.

If the camera probe has an electrically driven camera carriage, the camera carriage drive mechanism can also be connected to the joint power supply for the camera and the location finder. Prior art compact and correspondingly maneuverable camera probes already exist where the actual camera head is detachably fixed with a plug connection to a camera carriage, the operating voltage for the drive mechanism of the camera carriage also being sourced via the plug connection from the camera head connected directly to the camera cable. With these types of camera probes the location finder can be inserted with an appropriate plug connection between the camera head and the camera carriage. Conversely, it is also possible to connect the location finder to the camera carriage separately from the camera so that the location finder receives the operating voltage from the camera carriage, which is itself supplied with the operating voltage via the camera head. The electric plug connections on the camera head, the location finder and the camera carriage are preferably adapted to each other in such a way that the location finder can also optionally be connected direct to the camera head. This then makes it possible to optionally use the camera head with the location finder without the camera carriage and to advance it in the canal pipe eg. with a flexible rod.

Figure 9:
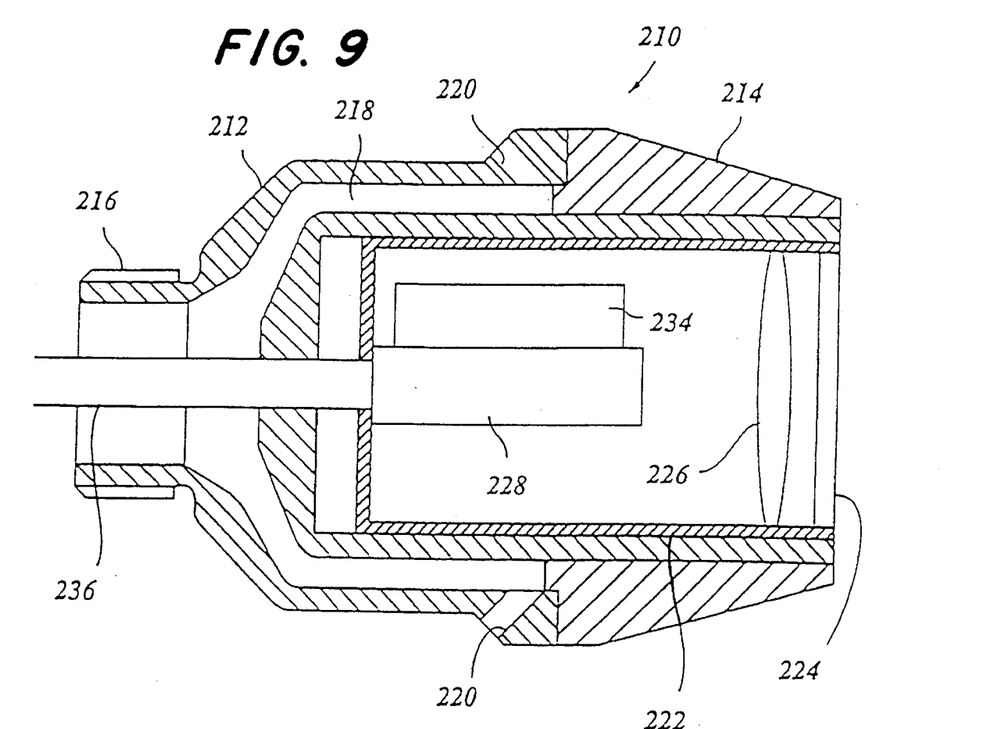
FIG. 9 is an axial section through a camera probe with location finder.

The camera probe 210 shown in FIG. 9 has a pot-shaped housing 212 which is closed off at the front end by a truncated cone-shaped end piece 214. At the rear end of the housing 212 a screw joint 216 is provided for a pressure hose (not shown). Contrived in the wall of the housing 212 is an annular chamber 218 whose rear end is connected to the screw joint 216 and whose front end is connected to reaction jets 220 oriented outwards and backwards at an angle. When water is supplied via the pressure hose at an appropriate pressure, the water is ejected radially through the reaction jets 220 and this effects the forward drive of the camera probe 210 and at the same time centres the camera probe in the canal pipe.

Figure 10:
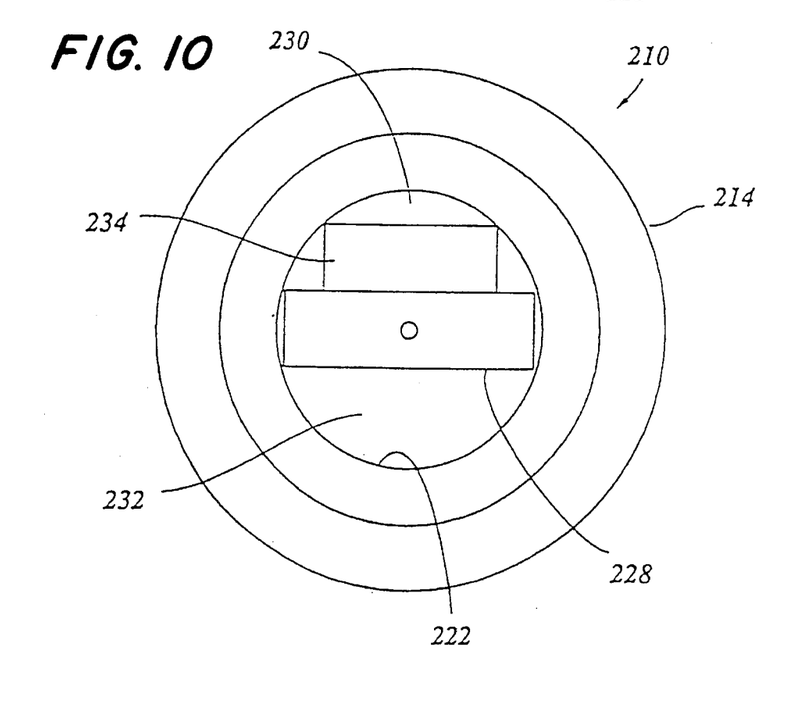
FIG. 10 is a front view of the camera probe of FIG. 9.

Accommodated in the front part of the housing 212 and the end piece 214 is a cylindrical camera housing 222 whose front end is closed off by a protective disk 224. The camera lens 226 is mounted directly behind the protective disk 224. A camera unit 228 containing electro-optical sensors and the camera electronics (not shown) is shaped like a flat, plate-like component and is mounted in the camera housing 222 in such a way that it lies along a plane of the diameter of the camera housing, as can be seen in FIG. 10. The camera unit 228 in the camera housing 222 thus borders on two hollow spaces 230,232 with a circular segment-shaped cross-section.

In the example of the embodiment shown, a location finder 234 is accommodated in the hollow space 230. The location finder can however also optionally be split into two components, each one of which is accommodated in one of the hollow spaces 230 and 232. This allows the location finder 234 to be accommodated in the camera housing 222 in a spatially economic way.

In the example shown, a camera cable 236 connected with the camera unit 228 is guided fluid-impermeably through the front of the housing 212 and runs through the inside of the screw joint 216 and the pressure hose (not shown). This camera cable 236 serves on the one hand to transmit the camera signal to a monitor (not shown) and on the other hand to power the camera unit 228 and the location finder 234.

The location finder 234 is, for example, a long-wave transmitter. The location finder can however also be an electromagnetic wave transmitter in a different frequency range or an ultrasonic generator or suchlike. The electronics (not shown separately) of the location finder are designed such that it can be operated at the same voltage as the camera unit 228, i.e. with a 12 Volt direct voltage.

Alternatively, the location finder 234 can however also operate like standard location finders with an operating voltage of 1.5 to 1.7 Volt. In this case the operating voltage can be supplied by a battery housed in the hollow space 232.

In the example shown, the cylindrical hollow space in the housing 212 and in the end piece 214 which serves to accommodate the camera housing 222, has a length of approx. 100 mm and a diameter of approx. 40 mm. Thus a location finder with a length of approx. 50 mm and a height of approx. 10 mm can easily be accommodated in each of the circular segment-shaped hollow spaces 230,232.

Figure 11:
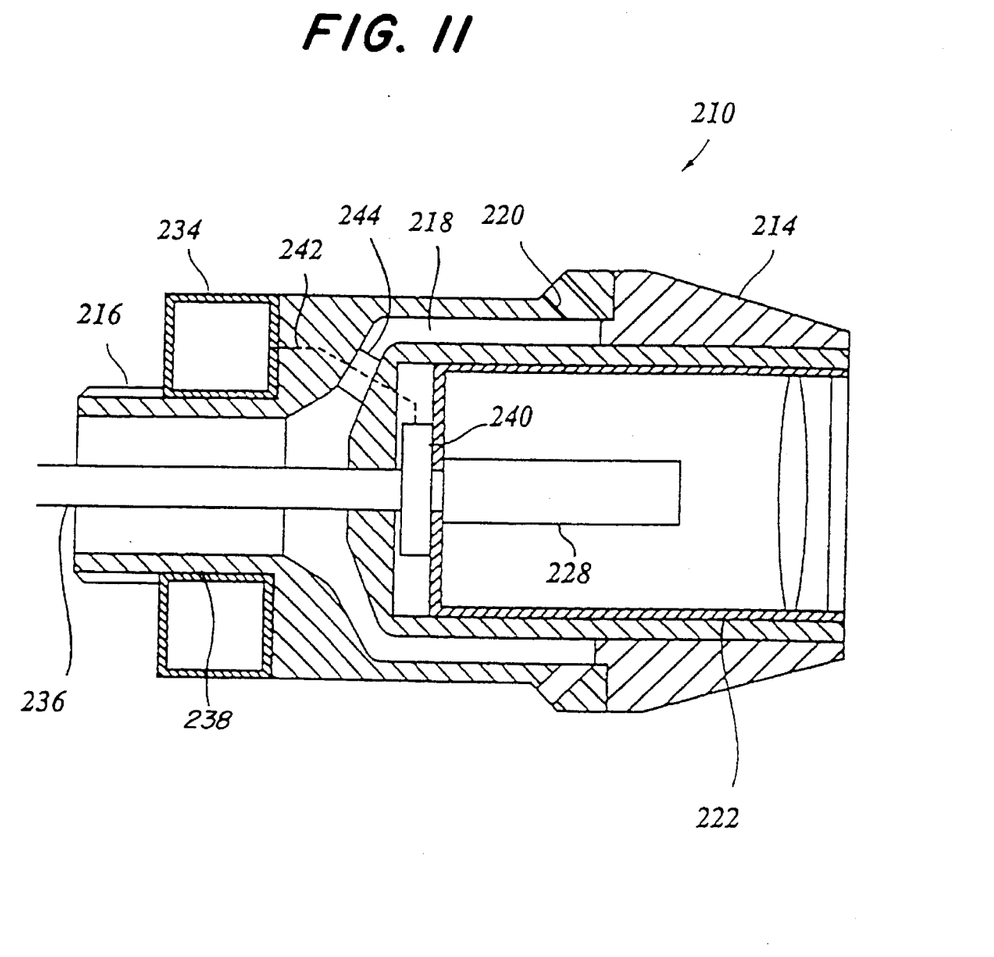
FIG. 11 is a section through a camera probe with location finder according to a modified example of an embodiment.

FIG. 11 shows a modified embodiment of the camera probe 210 in which a pipe-shaped shaft 238 is contrived between the screw joint 216 and the front end of the housing 212. The location finder 234, which in this case has a ring-shaped housing, sits on this shaft. In the example shown, the ring-shaped housing of the location finder 234 has an inner diameter which corresponds to the outer diameter of the shaft 238, and an outer diameter which corresponds to the outer diameter of the housing 212.

With this embodiment too, the location finder 234 can optionally be powered by a battery integrated in the housing of the location finder, or via the camera unit power supply. In the latter case, a connection terminal 240 connected with the camera cable is disposed between the camera housing 222 and the front end of the housing 212, which is connected with the location finder 234 via a Wire 242. The wire 242 runs, for example, through radial ribs 244 contrived in the annular chamber of the housing 212 and is thus protected against the flow of water.

The problem of introducing a probe into the subsidiary canal branching off from the main drain arises not only when damaged areas are spotted during the course of a canal inspection but also when such damaged areas are subsequently repaired. There exist various types of prior art equipment for being introduced into a canal pipe to carry out appropriate repair work. In particular, this equipment includes gripping, cutting or milling tools to remove foreign bodies like ingrown tree roots and suchlike, as well as devices for repairing damaged spots in the canal wall, eg. for filling out cracks or holes with filler or for lining the inside of the canal wall or injecting coating material over it. A modified embodiment of the device of the invention allows such work to be carried out in the subsidiary canal pipe as well. For this purpose, the required equipment is attached to the reaction-propelled probe instead of the camera probe, or in addition to it.

I claim:

1. A device for inspecting subsidiary canals which branch off from a main drain where a camera probe (24) is deflected from the main drain pipe (10) with a deflecting frame (22;76;96) into the branching off subsidiary canal pipe (12), characterized in that the camera probe (24) is driven forward in the subsidiary canal pipe (12) by propulsion, by supplying a pressure medium to reaction jets (34;90) mounted on the camera probe, said device including a camera probe (24) and a deflecting frame (22;76;96) which can be held in position in the main drain pipe (12) for deflecting the camera probe into the subsidiary canal, characterized in that the camera probe (24) is provided with reaction jets (34;90) and is connected to a hose (36) for supplying a pressure medium to the reaction jets, wherein the reaction jets (34) are contrived on a rim (32) which encircles the periphery of the camera probe (24) at a distance from its front end, and are oriented outwards at an angle in relation to the axis of the canal probe (24).

2. The device of claims 1, characterized in that the rear end of a hose (36) connected to the camera probe (24) is connected to another jet (104) to generate additional propulsion, which is itself connected to a hose (106) for supplying the pressure medium and which only responds when the pressure medium reaches a certain minimum pressure.

3. The device of claim 1, characterized in that the deflecting frame (96) is formed by a cylindrical block (98) to the rear end of which a push rod (100) is eccentrically fixed, and whose rear end forms a tapered deflecting surface (102) for the camera probe (24).

4. A device in accordance with claim 1, characterized in that the location finder (234) is integrated in the camera probe (210).

5. The device of claim 4, characterized in that the location finder (234) is accommodated in the camera housing (222).

6. The device of claim 4, characterized in that the location finder is mounted on or in a camera slide which accommodates the actual camera housing.

7. A device in accordance with claim 1, characterized in that the location finder (234) and the camera electronics (228) are connected via a camera cable (236) to a common power source.

8. A device for inspecting subsidiary canals which branch off from a main drain where a camera probe (24) is deflected from the main drain pipe (10) with a deflecting frame (22;76;96) into the branching off subsidiary canal pipe (12), characterized in that the camera probe (24) is driven forward in the subsidiary canal pipe (12) by propulsion, by supplying a pressure medium to reaction jets (34;90) mounted on the camera probe, said device including a camera probe (24) and a deflecting frame (22;76;96) which can be held in position in the main drain pipe (12) for deflecting the camera probe into the subsidiary canal, characterized in that the camera probe (24) is provided with reaction jets (34;90) and is connected to a hose (36) for supplying a pressure medium to the reaction jets, wherein a camera cable (40) connected to the camera probe (24) is integrated in the hose (36).

9. The device of claim 8, characterized in that the deflecting frame has a pipe-shaped mount (26) for accommodating the camera probe (24), which is pivotably fixed to a main drain probe (14;78).

10. The device of claim 9, characterized in that the main drain probe (78) is a basket-like essentially cylindrical frame to whose front end the mount (26) is pivotably fixed with hinge (84) and which is provided with guide eyelets (88) disposed radially beyond the hinge (84) for a draw rope (86) for pivoting the mount.

11. The device of claim 9, characterized by at least one guide roller (42) for the hose (36) disposed on the mount (26) or on the main drain probe (14;76).

12. The device of claim 9, characterized by a guide element (54) which is pivotable in relation to the main drain probe (14) for deflecting a rinsing hose (52) which can be introduced into the subsidiary canal pipe (12) independently of the camera probe (24).

13. The device of claim 12, characterized in that the guide element (54) is a guide channel fixed to the mount (26).

14. The device of claim 9, characterized in that a drive mechanism with at least one set of drive rollers (44;48) for driving the hose (36) and or rinsing hose (52) is provided on the main drain probe (14).

15. The device of claim 9, further including drive rollers characterized in that the mount (26) and the associated pivot drive mechanism (30) and the drive rollers (44,48) are mounted on a shaft (16) running parallel to the axis of the main drain pipe (10), which can be rotated around its axis relative to the main drain probe (14) by a drive motor (18).

16. The device of claims 9, characterized in that the main drain probe (14) is provided with roller feet (58) projecting radially in a star shape, whose free ends rest with driveable sets of rollers (60) against the inside surface of the main drain pipe (10).

* * * * *